United States Patent
Zheng et al.

(10) Patent No.: US 11,455,157 B2
(45) Date of Patent: Sep. 27, 2022

(54) DISPLAY DEVICE AND FIRMWARE UPDATING METHOD THEREOF

(71) Applicant: Wistron Corp., New Taipei (TW)

(72) Inventors: Li Fan Zheng, New Taipei (TW); Chih Chou Chou, New Taipei (TW); Su-Ming Lin, New Taipei (TW); Jun Xin Qiu, New Taipei (TW); Yong Qiang Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 359 days.

(21) Appl. No.: 16/751,258

(22) Filed: Jan. 24, 2020

(65) Prior Publication Data
US 2021/0109737 A1 Apr. 15, 2021

(30) Foreign Application Priority Data
Oct. 14, 2019 (CN) .......................... 201910974254.6

(51) Int. Cl.
 *G06F 8/65* (2018.01)
 *G06F 3/147* (2006.01)
 (Continued)

(52) U.S. Cl.
 CPC ............... *G06F 8/65* (2013.01); *G06F 3/147* (2013.01); *G06F 21/572* (2013.01); *G09G 5/006* (2013.01)

(58) Field of Classification Search
 CPC .......... G06F 8/65; G06F 3/147; G06F 21/572; G09G 5/006
 (Continued)

(56) References Cited

U.S. PATENT DOCUMENTS 5,809,466 A * 9/1998 Hewitt .................... G06F 7/026
 704/503
9,442,537 B2 9/2016 Tsai
 (Continued)

FOREIGN PATENT DOCUMENTS

JP 2003-044166 A 2/2003
TW 200920134 A 5/2009
 (Continued)

OTHER PUBLICATIONS

Klug et al, "A Scalable, Collaborative, Interactive Light-field Display System", 2013, [Online], pp. 1-4, [Retrieved from internet on Jul. 15, 2022], <https://sid.onlinelibrary.wiley.com/doi/pdf/10.1002/j.2168-0159.2013.tb06234.x> (Year: 2013).*

(Continued)

*Primary Examiner* — S. Sough
*Assistant Examiner* — Zengpu Wei
(74) *Attorney, Agent, or Firm* — McClure, Qualey & Rodack, LLP

(57) ABSTRACT

A display device includes a display panel, a first storage device, a second storage device and a control device. The first storage device is disposed on the display panel and stores a first firmware. The second storage device stores a second firmware. The control device is coupled to the first storage device and the second storage device. The control device reads the first firmware and uses the first firmware to update the second firmware, or receives a third firmware transmitted by a host terminal device and uses the third firmware to update the second firmware. The control device executes the updated second firmware to generate an image signal corresponding to the updated second firmware to the display panel. Therefore, the efficiency of updating the firmware of the display device may be effectively increased, and the convenience of use is increased.

17 Claims, 3 Drawing Sheets

(51) Int. Cl.
   *G09G 5/00*   (2006.01)
   *G06F 21/57*  (2013.01)
(58) Field of Classification Search
   USPC .......................................................... 717/168
   See application file for complete search history.

(56) References Cited

U.S. PATENT DOCUMENTS

| | | | |
|---|---|---|---|
| 2006/0034039 | A1 | 2/2006 | Van Rens |
| 2007/0291167 | A1* | 12/2007 | Inokawa ............ H04N 21/2365 |
| | | | 348/387.1 |
| 2009/0249320 | A1* | 10/2009 | Su ............................ G06F 8/65 |
| | | | 717/168 |
| 2010/0201700 | A1* | 8/2010 | Kusumoto ............. G09G 5/006 |
| | | | 345/545 |
| 2013/0036411 | A1* | 2/2013 | Liu ........................... G06F 8/65 |
| | | | 717/168 |
| 2013/0013498 | A1 | 5/2013 | Park |
| 2013/0134987 | A1 | 5/2013 | Park |
| 2015/0082299 | A1* | 3/2015 | Kobayashi ................ G06F 8/61 |
| | | | 717/174 |
| 2017/0206077 | A1 | 7/2017 | Kulkarni et al. |
| 2017/0293336 | A1* | 10/2017 | Wang ......................... G06F 1/28 |
| 2018/0129518 | A1* | 5/2018 | Lee ............................ G06F 3/14 |
| 2021/0084099 | A1* | 3/2021 | Choiniere ............. H04L 67/306 |

FOREIGN PATENT DOCUMENTS

| | | |
|---|---|---|
| TW | M496832 U | 3/2015 |
| TW | 201606651 A | 2/2016 |

OTHER PUBLICATIONS

Chinese language office action dated Nov. 4, 2020, issued in application No. TW 108138534.

* cited by examiner

DISPLAY DEVICE AND FIRMWARE UPDATING METHOD THEREOF

CROSS REFERENCE TO RELATED APPLICATIONS

This application claims priority of China Patent Application No. 201910974254.6, filed on Oct. 14, 2019, the entirety of which is incorporated by reference herein.

BACKGROUND OF THE INVENTION

Field of the Invention

An embodiment of the present invention relates to a firmware updating method, a display device and a firmware updating method thereof.

Description of the Related Art

With the rapid development of technology, smart information products that are thin, light, power-saving, and portable have become indispensable items in people's lives. Displays play a very important role in this process. For example, mobile phones, personal digital assistants, and notebook computers all need a display to aid in the human-computer interface. The firmware of the display is used to control the operations of the display. For example, firmware is provided to the user to adjust the functions of the display, such as the brightness, the contrast, the color temperature, the clock, the focus, and the gamma correction.

During the development and design of the display, the manufacturer of the display may continuously test the firmware of the display to obtain the most stable firmware version. Even after the display leaves the factory, the manufacturer may issue new versions of firmware to add new features or solve compatibility problem between the display and the computer system, according to the requirements of the user. The latest version of firmware is used, so that the display may provide the best performance. When the display does not work normally or the user wants to add new functions to the display, the display needs to be sent back to the repair center for assistance in updating the new firmware.

Therefore, how to effectively increase the efficiency of the firmware updating of the display device and increase the convenience of use has become an important issue.

BRIEF SUMMARY OF THE INVENTION

An embodiment of the present invention provides a display device and a firmware updating method thereof, thereby effectively increasing the efficiency of the firmware updating of the display device, and increasing the convenience of use.

An embodiment of the present invention provides a display device, which includes a display panel, a first storage device, a second storage device and a control device. The first storage device is disposed in the display panel, and configured to store a first firmware. The second storage device is configured to store a second firmware. The control device is coupled to the first storage device and the second storage device. The control device reads the first firmware and performs an updating operation on the second firmware through the first firmware, or the control device receives a third firmware transmitted by a host device and performs the updating operation on the second firmware through the third firmware. The control device executes the updated second firmware to generate an image signal corresponding to the updated second firmware to the display panel.

In addition, an embodiment of the present invention provides a firmware updating method of a display device, which includes the following steps. A first storage device is disposed in a display panel. A first firmware is stored in the first storage device. A second firmware is stored in a second storage device. A control device is used to read the first firmware and performs an updating operation on the second firmware through the first firmware, or receive a third firmware transmitted by a host device and perform the updating operation on the second firmware through the third firmware, and execute the updated second firmware to generate an image signal corresponding to the updated second firmware to the display panel.

According to the display device and the firmware updating method thereof disclosed by the embodiment of the present invention, the first storage device is disposed in the display panel and stores the first firmware. The second storage device stores the second firmware. The control device reads the first firmware and performs the updating operation on the second firmware through the first firmware, or the control device receives the third firmware transmitted by the host device and performs the updating operation on the second firmware through the third firmware. Then, the control device executes the updated second firmware to generate the image signal corresponding to the updated second firmware to the display panel. Therefore, a plurality of hosts may share the same input device, so as to increase the convenience of use.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents the same or similar element or component.

Figure 1:
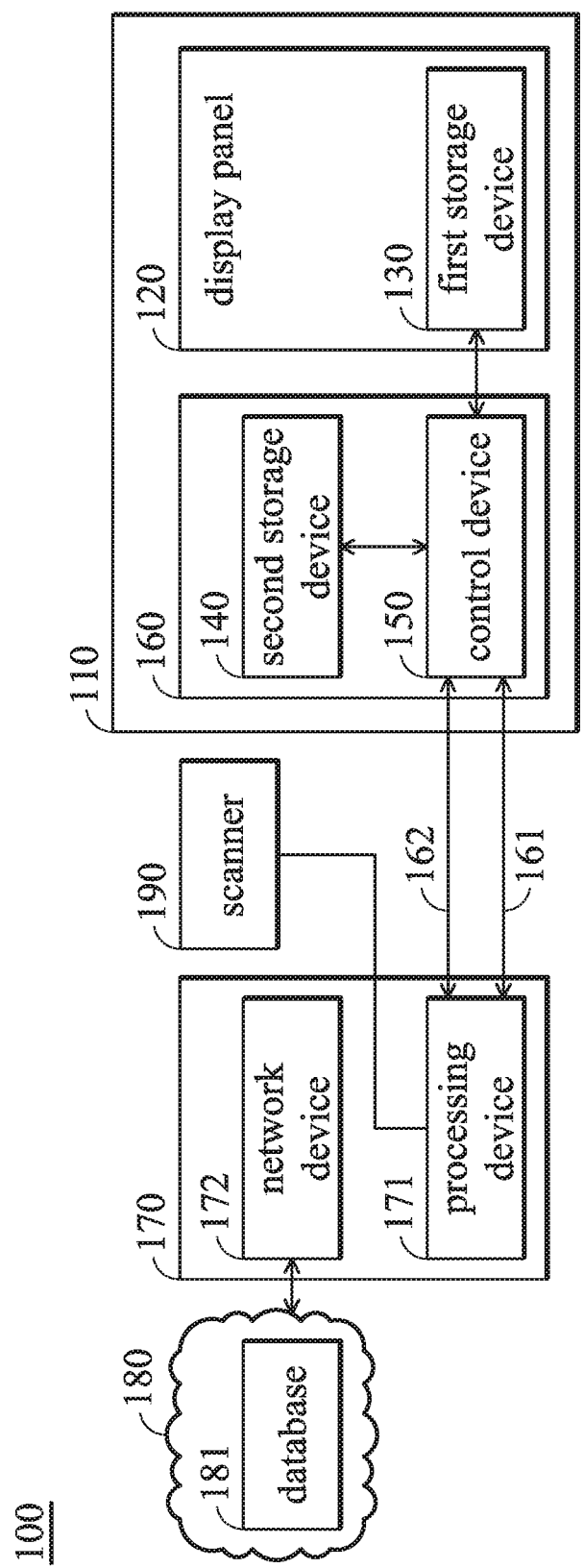
FIG. 1 shows a schematic view of a display system according to an embodiment of the present invention.

FIG. 1 shows a schematic view of a display system according to an embodiment of the present invention. Please refer to FIG. 1. The display system 100 includes a display device 110 and a host device 170.

In the embodiment, the display system 100 may be a display such as a liquid-crystal display (LCD), a light-emitting diode (LED) display, a field emission display (FED), or another kind of display. In addition, the display device 110 may be an independent display or monitor.

The display device 110 includes a display panel 120, a first storage device 130, a second storage device 140 and a control device 150. In the embodiment, the display panel 120 may be a liquid-crystal display panel, a light-emitting diode display panel, a field emission display panel, or another kind of display panel.

The first storage device 130 is disposed in the display panel 120 and configured to store a first firmware. In the embodiment, the first storage device 130 may be a non-volatile random access memory (NVRAM), such as an erasable programmable read-only memory (EPROM), an electrically erasable programmable read-only memory (EEPROM), a flash memory, etc. In addition, the first firmware includes, for example, optical features, a display brightness and optical data (such as sRGB Delta-E) of the display panel 120. Furthermore, the manufacturer or the designer may burn the first firmware into the first storage device 130 in advance.

The second storage device 140 is configured to store a second firmware. In the embodiment, the version of the first firmware and the version of the second firmware are different. In addition, the second storage device 140 may also be a non-volatile random access memory, such as an erasable programmable read-only memory, an electrically erasable programmable read-only memory, a flash memory, etc.

The control device 150 is coupled to the first storage device 130 and the second storage device 140. In some embodiments, the control device 150 may read the first firmware stored in the first storage device 130, and performs an updating operation on the second firmware stored in the second storage device 140 through the first firmware. For example, the first firmware of the first storage device 130 is used to cover the second firmware of the second storage device 140, so that the version of the updated second firmware is the same as the version of the first firmware.

Furthermore, before the updating operation of the firmware, the control device 150 may read the first firmware of the first storage device 130 and the second firmware of the second storage device 140, and compare whether the version of the first firmware is the same as the version of the second firmware. When the control device 150 compares that the version of the first firmware is different from the version of the second firmware, the control device 150 may perform the above updating operation of the firmware. In addition, when the control device 150 compares that the version of the first firmware is the same as the version of the second firmware, the control device 150 does not perform the above updating operation of the firmware.

Then, after the firmware updating is completed, the control device 150 may execute the updated second firmware stored in the second storage device 140 to generate an image signal corresponding to the updated second firmware to the display panel 120, so that the display panel 120 displays a display frame corresponding to the image signal. Therefore, the efficiency of the firmware updating may be effectively increased, and the convenience of use is increased.

In the embodiment, the control device 150 is, for example, a scaler having a frame zoom function, a micro-controller unit (MCU) or other hardware devices having computing processing capability.

Furthermore, the display device 110 further includes a circuit board 160. The circuit board 160 is detachably disposed in the display device 110, and the second storage device 140 and the control device 150 are disposed on the circuit board 160. That is, the user may plug out the circuit board 160 from the display device 110. Then, the user may plug a new circuit board that is the same as the circuit board 160 in the display device 110.

After the new circuit board is installed in the display panel 120, the control device of the new circuit board may be coupled to the first storage device 130 of the display panel 120. The control device of the new circuit board reads the first firmware of the first storage device 130 and performs the updating operation on a second firmware of a second storage device of the new circuit board through the first firmware, so that the version of the updated second firmware is the same as the version of the first firmware.

Then, after the firmware updating is completed, the control device of the new circuit board may execute the updated second firmware stored in the second storage device to generate an image signal corresponding to the updated second firmware to the display panel 120, so that the display panel 120 displays a display frame corresponding to the image signal. Therefore, the efficiency of the firmware updating may be effectively increased, and the convenience of use is increased.

In the embodiment, the circuit board 160 is, for example, a printed circuit board (PCB). Furthermore, the circuit board 160 is, for example, a circuit board having a plug and play (PnP) interface, and the circuit board 160 is connected to the host device 170 through a connector 161 having a display data channel/command interface (DDC/CI). That is, the control device 150 of the circuit board 160 may be coupled to a processing device 171 of the host device 170, so as to transmit the signals and the data.

In the embodiment, the host device 170 is, for example, a personal computer (PC), a notebook computer, a server host, etc. In addition, the host device 170 includes the processing device 171 and a network device 172. The processing device 171 is coupled to the network device 172. The processing device 171 is, for example, a micro-controller unit (MCU), a central processing unit (CPU) or other hardware devices having computing processing capability. The network device 172 may provide a network connection in a wired manner, such as Ethernet, optical fiber network, asymmetric digital subscriber line (ADSL), etc. Alternatively, the network device 172 may also provide the network connection in a wireless manner, such as wireless fidelity (Wi-Fi) technology, or other telecommunication network technologies.

In some embodiments, the control device 150 is coupled to the host device 170 through, for example, a universal series bus (USB) connector 162. That is, the control device 150 may be coupled to the processing device 171 of the host device 170, so as to receive a third firmware transmitted by the processing device 171 of the host device 170 and perform the updating operation on the second firmware through the third firmware.

For example, the third firmware transmitted by the host device 170 covers the second firmware of the second storage device 140, so that the version of the updated second firmware is the same as the version of the third firmware. In the embodiment, the third firmware includes, for example, optical features, a display brightness and optical data of the display panel 120.

Then, after the firmware updating is completed, the control device 150 may execute the updated second firmware stored in the second storage device 140 to generate the image signal corresponding to the updated second firmware to the display panel 120, so that the display panel 120 displays the display frame corresponding to the image signal. Therefore, the efficiency of the firmware updating may be effectively increased, and the convenience of use is increased.

Furthermore, the processing device 171 of the host device 170 may first obtain the series number of the display device 110. Then, the processing device 171 may be connected to a database 181 of a cloud 180 through the network connection provided by the network device 172. Afterward, the processing device 171 may obtain the third firmware corresponding to the series number of the display device 110 from the database 181 of the cloud 180 according to the series number of the display device 110. Then, the processing device 171 provides the third firmware to the control device 150 of the display device 110, so as to perform the updating operation of the firmware. In the embodiment, the manufacturer or the designer may store the third firmware into the database 181 of the cloud 180 in advance.

In addition, in some embodiments, the series number may be a barcode or a quick response code (QR code) and the series number is disposed on a case (not shown) of the display device 110. The host device 170 obtains the series number through a scanner 190. That is, the user may scan the series number on the case of the display device 110 through the scanner 190, and the series number is transmitted to the processing device 171 of the host device 170. Accordingly, the processing device 171 obtains the third firmware corresponding to the series number of the display device 110 from the database 181 of the cloud 180 according to the series number of the display device 110.

In some embodiments, for example, the series number is generated by the display panel 120 that is controlled by the control device 150 according to the control signal generated by the host device 170. The host device 170 obtains the series number through the scanner 190. That is, the user may operate the host device 170, so that the processing device 171 generates a control signal to the control device 150. Then, the control device 150 controls the display panel 120 to generate the series number of the display device 110 according to the control signal. Afterward, the user scans the series number displayed by the display device 110 through the scanner 190, and the series number is transmitted to the processing device 171 of the host device 170. Accordingly, the processing device 171 obtains the third firmware corresponding to the series number of the display device 110 from the database 181 of the cloud 180 according to the series number of the display device 110.

In some embodiments, the series number may also be stored in the second storage device 140. The processing device 171 of the host device 170 may generate a control signal to the control device 150, so as to control the control device 150 to read the second storage device 140 and obtain the series number. Accordingly, the processing device 171 obtains the third firmware corresponding to the series number of the display device 110 from the database 181 of the cloud 180 according to the series number of the display device 110.

In addition, the user may also operate an input device (such as a keyboard) to generate the series number of the display device 110, and the series number is transmitted to the processing device 171. Accordingly, the processing device 171 obtains the third firmware corresponding to the series number of the display device 110 from the database 181 of the cloud 180 according to the series number of the display device 110.

In some embodiments, before the updating operation of the firmware, the control device 150 may determine whether the display device 110 is coupled to the host device 170. When the control device 150 determines that the display device 110 is not coupled to the host device 170, the control device 150 may select to read the first firmware of the first storage device 130 and update the second firmware of the second storage device 140 through the first firmware. When the control device 150 determines that the display device 110 is coupled to the host device 170, the control device 150 may select to receive the third firmware transmitted by the host device 170 and update the second firmware of the second storage device 140 through the third firmware.

In addition, when the control device 150 determines that the display device 110 is coupled to the host device 170 the control device 150 may also select to read the first firmware of the first storage device 130 and update the second firmware of the second storage device 140 through the first firmware, or select to receives the third firmware transmitted by the host device 170 and update the second firmware of the second storage device 140 through the third firmware according to an internal setting.

In some embodiments, the manufacturer or the designer may operate the host device 170, so that the processing device 171 may generate a control command to the control device 150. Then, the control device 150 controls the display panel 120 to generate a first test pattern according to the control command. Afterward, the host device 170 may obtain color information corresponding to the first test pattern through a color analyzer. Then, the processing device 171 may generate an adjusting message according to the color information corresponding to the first test pattern, wherein the adjusting message may include optical features, a display brightness and optical data of the display panel 120.

Afterward, the processing device 171 transmits the adjusting message to the control device 150, so that the control device 150 controls the display panel 120 to generate a second test pattern according to the adjusting message. Then, the host device 170 may obtain color information corresponding to the second test pattern through the color analyzer. Afterward, the processing device 171 may determine whether the color information corresponding to the second test pattern conforms to a requirement according to the color information corresponding to the second test pattern.

When determining that the color information corresponding to the second test pattern does not conform to the requirement, the processing device 171 may generate the adjusting message again, and obtain the color information corresponding to the second test pattern until the color information corresponding to the second test pattern conforms to the requirement. When determining that the color information corresponding to the second test pattern conforms to the requirement, the processing device 171 may make the adjusting message into the first firmware, and the first firmware is burned into the first storage device 130 through the control device 150.

In addition, the manner of generating the third firmware is the same as the manner of generating the first firmware. Accordingly, the manner of generating the third firmware may refer to the manner of generating the first firmware, and the description thereof is not repeated herein. When the processing device 171 makes the adjusting message into the third firmware, the processing device 171 may upload the third firmware to the database 181 of the cloud 180 through the network device 172.

Figure 2:
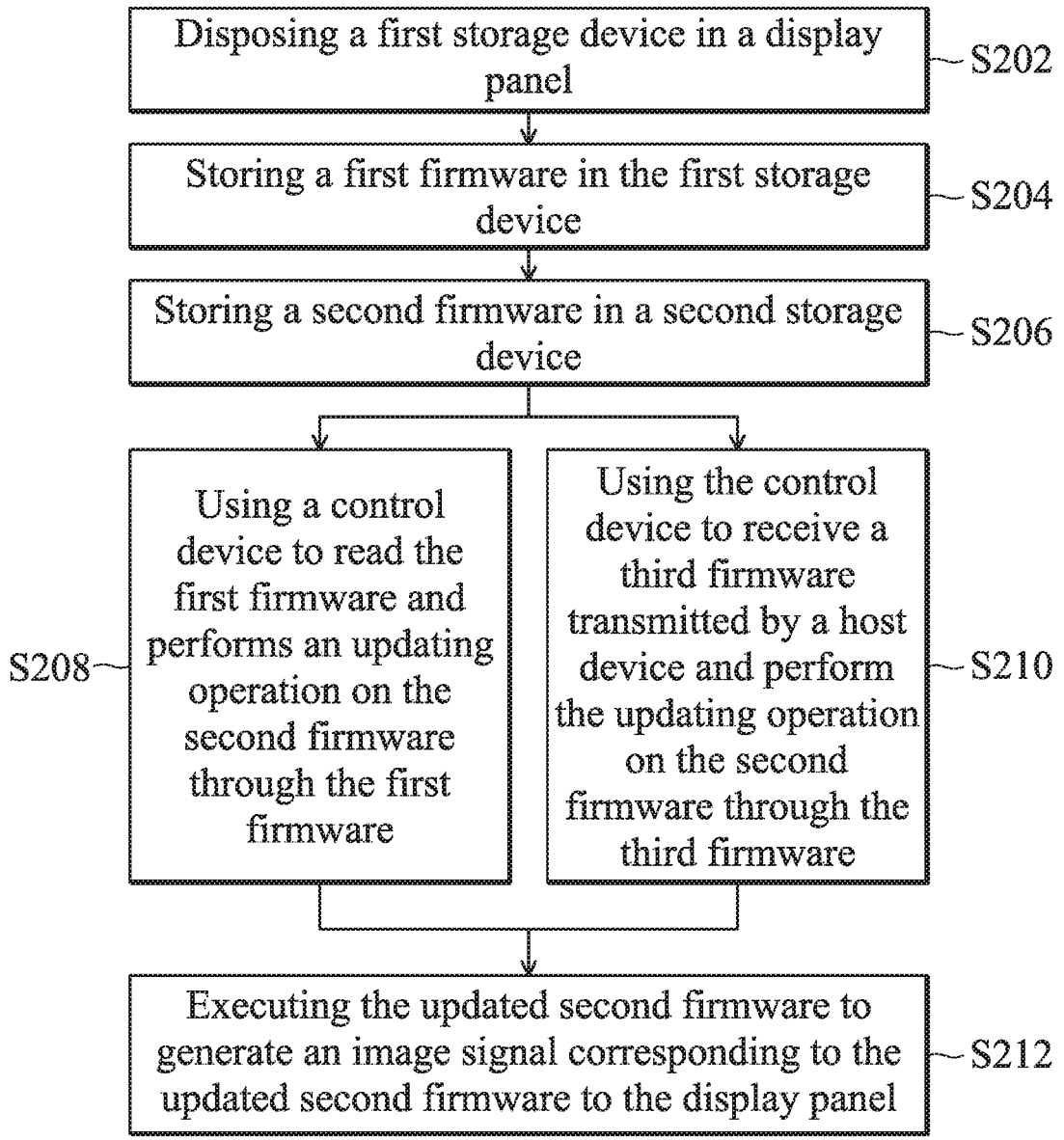
FIG. 2 shows a flowchart of a firmware updating method of a display device according to an embodiment of the present invention.

According to the above-mentioned description, the embodiment of the present invention additionally provides a firmware updating method of a display device. FIG. 2 shows a flowchart of a firmware updating method of a display device according to an embodiment of the present invention. In step S202, the method involves disposing a first storage device in a display panel. In step S204, the method involves storing a first firmware in the first storage device. In step S206, the method involves storing a second firmware in a second storage device.

In step S208, the method involves using a control device to read the first firmware and performs an updating operation on the second firmware through the first firmware. In step S210, the method involves using the control device to receive a third firmware transmitted by a host device and perform the updating operation on the second firmware through the third firmware. In step S212, the method involves executing the updated second firmware to generate an image signal corresponding to the updated second firmware to the display panel.

In the embodiment, the first firmware includes optical features, a display brightness and optical data of the display panel. In addition, the display device further includes a circuit board detachably disposed in the display device, wherein the second storage device and the control device are disposed on the circuit board. Furthermore, the circuit board is a circuit board having a plug and play interface, and the circuit board is connected to the host device through a connector having a display data channel/command interface.

Figure 3:
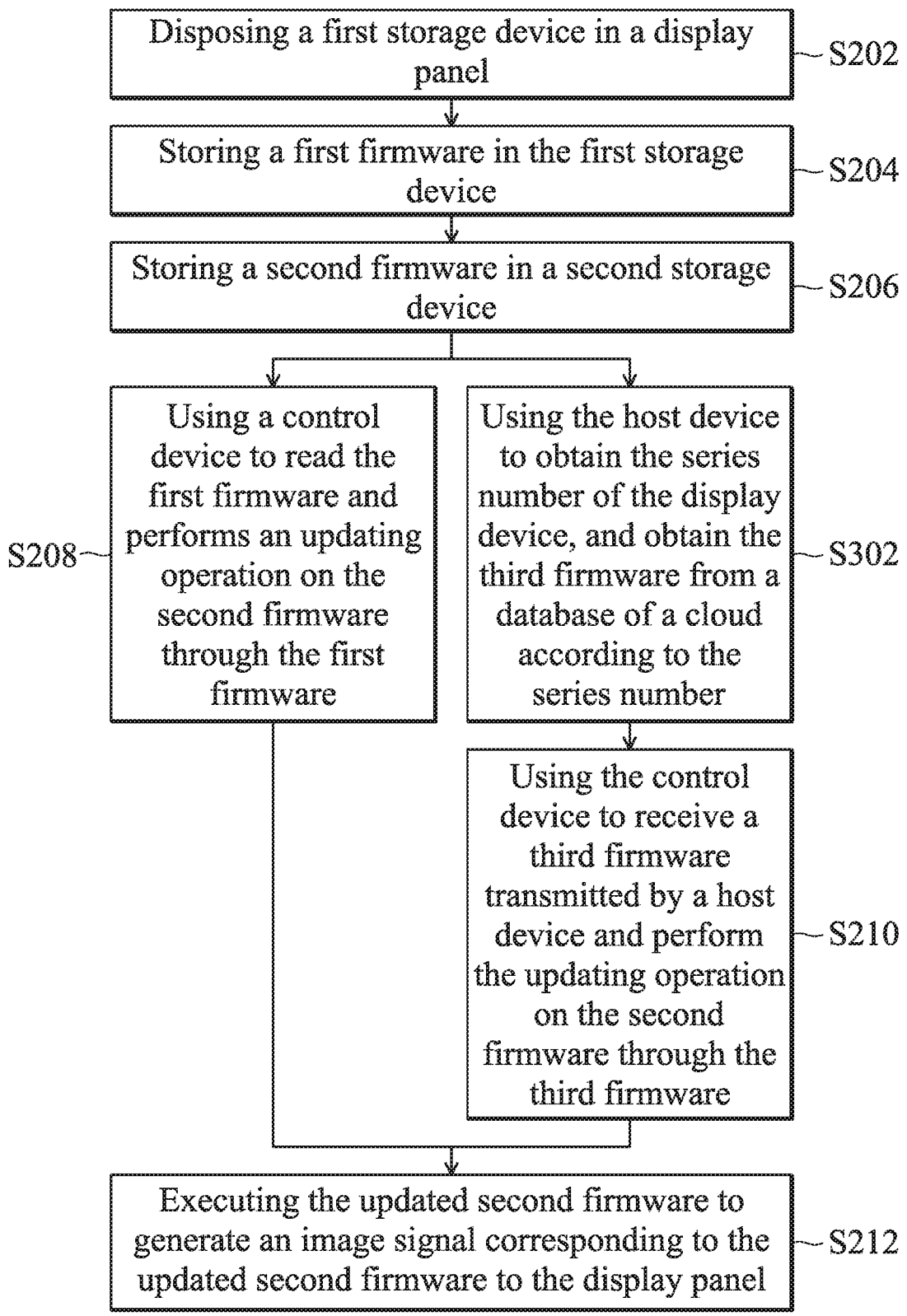
FIG. 3 shows a flowchart of a firmware updating method of a display device according to another embodiment of the present invention.

FIG. 3 shows a flowchart of a firmware updating method of a display device according to another embodiment of the present invention. In the embodiment, steps S202~S212 in FIG. 3 are the same as steps S202~S212 in FIG. 2. Accordingly, steps S202~S212 in FIG. 3 may refer to the description of the embodiment of FIG. 2, and the description thereof is not repeated herein.

In step S302, the method involves using the host device to obtain the series number of the display device, and obtain the third firmware from a database of a cloud according to the series number.

In some embodiments, the series number is disposed on the case of the display device, or the series number is generated by the display panel that is controlled by the control device according to a control signal generated by the host device, and the host device obtains the series number through a scanner. In some embodiments, the series number is stored in the second storage device, the host device controls the control device to read the second storage device, so as to obtain the series number. In some embodiments, the third firmware includes optical features, a display brightness and optical data of the display panel.

In summary, according to the display device and the firmware updating method thereof disclosed by the embodiment of the present invention, the first storage device is disposed in the display panel and stores the first firmware. The second storage device stores the second firmware. The control device reads the first firmware and performs the updating operation on the second firmware through the first firmware, or the control device receives the third firmware transmitted by the host device and performs the updating operation on the second firmware through the third firmware. Then, the control device executes the updated second firmware to generate the image signal corresponding to the updated second firmware to the display panel. In addition, the embodiment of the present disclosure may further use the host device to obtain the series number of the display device and obtain the third firmware from the database of the cloud according to the series number. Therefore, a plurality of hosts may share the same input device, so as to increase the convenience of use.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
   a display panel;
   a first storage device, disposed in the display panel, and configured to store a first firmware;
   a second storage device, configured to store a second firmware; and
   a control device, coupled to the first storage device and the second storage device, wherein the control device reads the first firmware and performs an updating operation on the second firmware through the first firmware in response to the display device not being coupled to a host device, and the control device executes the updated second firmware to generate an image signal corresponding to the updated second firmware to the display panel.

2. The display device as claimed in claim 1, wherein the first firmware comprises optical features, a display brightness and optical data of the display panel.

3. The display device as claimed in claim 1, further comprising:
   a circuit board, detachably disposed in the display device, wherein the second storage device and the control device are disposed on the circuit board.

4. The display device as claimed in claim 3, wherein the circuit board is a circuit board having a plug and play (PnP) interface, and the circuit board is connected to the host device through a connector having a display data channel/command interface.

5. The display device as claimed in claim 1, wherein the control device receives a third firmware transmitted by a host device and performs the updating operation on the second firmware through the third firmware in response to the display device being coupled to the host device, and the control device executes the updated second firmware to generate the image signal corresponding to the updated second firmware to the display panel, the host device further obtains a series number of the display device, and obtains the third firmware from a database of a cloud according to the series number.

6. The display device as claimed in claim 5, wherein the series number is disposed on a case of the display device, or the series number is generated by the display panel that is controlled by the control device according to a control generated by the host device, and the host device obtains the series number through a scanner.

7. The display device as claimed in claim 5, wherein the series number is stored in the second storage device, and the host device controls the control device to read the second storage device, so as to obtain the series number.

8. The display device as claimed in claim 5, wherein the control device is coupled to the host device through a universal series bus connector.

9. The display device as claimed in claim 5, wherein the third firmware comprises optical features, a display brightness and optical data of the display panel.

10. A firmware updating method of a display device, comprising:
    disposing a first storage device in a display panel;
    storing a first firmware in the first storage device;
    storing a second firmware in a second storage device; and
    using a control device to read the first firmware and perform an updating operation on the second firmware through the first firmware in response to the display device not being coupled to a host device, and execute the updated second firmware to generate an image signal corresponding to the updated second firmware to the display panel.

11. The firmware updating method of the display device as claimed in claim 10, wherein the first firmware comprises optical features, a display brightness and optical data of the display panel.

12. The firmware updating method of the display device as claimed in claim 10, wherein the display device further comprises a circuit board, detachably disposed in the display device, wherein the second storage device and the control device are disposed on the circuit board.

13. The firmware updating method of the display device as claimed in claim 12, wherein the circuit board is a circuit board having a plug and play (PnP) interface, and the circuit board is connected to the host device through a connector having a display data channel/command interface.

14. The firmware updating method of the display device as claimed in claim 10, further comprising:
 using the control device to receive a third firmware transmitted by the host device and perform the updating operation on the second firmware through the third firmware in response to the display device being coupled to the host device, and execute the updated second firmware to generate the image signal corresponding to the updated second firmware to the display panel;
 using the host device to obtain a series number of the display device, and obtain the third firmware from a database of a cloud according to the series number.

15. The firmware updating method of the display device as claimed in claim 14, wherein the series number is disposed on a case of the display device, or the series number is generated by the display panel that is controlled by the control device according to a control signal generated by the host device, and the host device obtains the series number through a scanner.

16. The firmware updating method of the display device as claimed in claim 14, wherein the series number is stored in the second storage device, and the host device controls the control device to read the second storage device, so as to obtain the series number.

17. The firmware updating method of the display device as claimed in claim 14, wherein the third firmware comprises optical features, a display brightness and optical data of the display panel.

* * * * *